United States Patent
Majumdar et al.

(10) Patent No.: US 11,738,606 B2
(45) Date of Patent: Aug. 29, 2023

(54) MULTILAYER INTRINSIC SEALANTS BASED ON IONIC BUTYL

(71) Applicant: Triangle Tyre Co. Ltd., Weihai (CN)

(72) Inventors: Ramendra Nath Majumdar, Hudson, OH (US); Wang Dapeng, Weihai (CN)

(73) Assignee: Triangle Tyre Co. Ltd., Weihai (CN)

( * ) Notice: Subject to any disclaimer, the term of this patent is extended or adjusted under 35 U.S.C. 154(b) by 145 days.

(21) Appl. No.: 17/175,593

(22) Filed: Feb. 12, 2021

(65) Prior Publication Data

US 2021/0162691 A1 Jun. 3, 2021

Related U.S. Application Data

(63) Continuation-in-part of application No. 16/819,701, filed on Mar. 16, 2020, now Pat. No. 10,919,242, which is a continuation-in-part of application No. 14/991,575, filed on Jan. 8, 2016, now Pat. No. 10,589,478, which is a continuation-in-part of application No. 14/572,138, filed on Dec. 16, 2014, now Pat. No. 10,399,391.

(51) Int. Cl.
*B60C 19/12* (2006.01)

(52) U.S. Cl.
CPC .................. *B60C 19/122* (2013.01)

(58) Field of Classification Search
CPC .............................. B60C 19/12; B60C 19/122
See application file for complete search history.

(56) References Cited

U.S. PATENT DOCUMENTS

| | | | | |
|---|---|---|---|---|
| 4,616,048 A | * | 10/1986 | De Trano | C08J 3/215 152/503 |
| 4,665,963 A | * | 5/1987 | Timar | B29D 30/0681 152/504 |
| 4,895,610 A | | 1/1990 | Egan | |
| 6,837,287 B2 | | 1/2005 | Smith, Sr. et al. | |
| 6,915,826 B2 | | 7/2005 | Poling et al. | |

(Continued)

FOREIGN PATENT DOCUMENTS

JP 52049501 A * 4/1977 ......... B29D 30/0685

OTHER PUBLICATIONS

Machine Translation: JP-52049501-A, Takusagawa T, (Year: 2022).*

(Continued)

*Primary Examiner* — Kendra Ly
(74) *Attorney, Agent, or Firm* — Brian Harrod; George W. Moxon, II

(57) ABSTRACT

A tire with in-situ generated two or more intrinsic puncture sealant layers based on ionic butyl with two or more different viscosities comprising a supporting tire carcass having one or more layers of ply, an outer circumferential tread, and a radially inner layer, a pair of beads, sidewalls extending radially inward from the axial outer edges of a tread portion to join the respective beads, a sealant comprising an outer layer of sealant and an inner layer of sealant, disposed radially inwardly from the radially inner layer of the tire carcass, wherein the outer layer of sealant and the inner layer of sealant have different viscosities, wherein the sealant provides self-sealing properties to the tire, and wherein the inner layer of sealant is cross-linked to the outer layer of sealant with no barrier separating the inner and outer layers of sealant.

15 Claims, 2 Drawing Sheets

(56) References Cited

U.S. PATENT DOCUMENTS

| | | |
|---|---|---|
| 6,962,181 B2 | 11/2005 | Deevers et al. |
| 7,073,550 B2 | 7/2006 | Reiter et al. |
| 7,332,047 B2 | 2/2008 | Majumdar et al. |
| 7,419,557 B2 | 9/2008 | Majumdar et al. |
| 7,662,480 B2 | 2/2010 | Resendes et al. |
| 7,674,344 B2 | 3/2010 | D'Sidocky et al. |
| 8,021,730 B2 | 9/2011 | Tsou et al. |
| 8,158,721 B2 | 4/2012 | Stevenson et al. |
| 8,293,049 B2 | 10/2012 | Incavo |
| 8,316,903 B2 | 11/2012 | Majumdar et al. |
| 8,534,331 B2 | 9/2013 | Dubos et al. |
| 8,646,501 B2 | 2/2014 | Ruegg, Jr. |
| 8,776,851 B2 | 7/2014 | Majumdar |
| 8,946,319 B2 | 2/2015 | Adkinson et al. |
| 10,737,539 B2 | 8/2020 | Ruegg, Jr. et al. |
| 2004/0149366 A1* | 8/2004 | Makino ............ B29C 73/20 152/504 |
| 2005/0113502 A1 | 5/2005 | Fitzharris Wall et al. |
| 2005/0215684 A1 | 9/2005 | Fitzharris Wall |
| 2009/0084483 A1* | 4/2009 | Majumdar ......... B29D 30/0685 156/115 |
| 2009/0205765 A1 | 8/2009 | Sostmann et al. |
| 2009/0272476 A1* | 11/2009 | Wilson ............... B29C 73/22 524/392 |
| 2012/0148773 A1 | 6/2012 | Parent et al. |
| 2015/0107743 A1 | 4/2015 | Seong |
| 2016/0068031 A1 | 3/2016 | Kaszas et al. |

OTHER PUBLICATIONS

D. Adkinson, S. Malmberg, J. Bielby, and K. Kulbaba, "Butyl Ionomers—A New Grade of Butyl Rubber for Tire Applications", Rubber Division, American Chemical Society, Fall 186th technical Meeting, Paper # 45, Oct. 14-16, 2014.

D. Adkinson, S. Malmberg, J. Bielby, and K. Kulbaba, "Butyl Ionomers—A New Class of Butyl Rubber for Tire Inner Liner Applications", ITEC 2014, Paper # 41, Sep. 9, 2014.

G. Bohm, L Jia, and G. Stephanopoulos, "Core Rubber Recycling Problems and New Solutions", Tire Technology Expo, Hannover, Germany, Feb. 27, 2020.

\* cited by examiner

MULTILAYER INTRINSIC SEALANTS BASED ON IONIC BUTYL

CROSS REFERENCE TO RELATED APPLICATIONS

This application is a continuation-in-part of, and claims the benefit of, U.S. patent application Ser. No. 16/819,701, filed Mar. 16, 2020, which is entitled "Pneumatic Tire with In-Situ Generated Sealant Composition by Chain Cessation of Ionic Butyl," which is a continuation-in-part of, and claims the benefit of, U.S. patent application Ser. No. 14/991,575, filed Jan. 8, 2016, which is entitled "Pneumatic Tire Having Sealant Layer," which is a continuation-in-part of, and claims the benefit of, U.S. patent application Ser. No. 14/572,138, filed Dec. 16, 2014, which is entitled "Pneumatic Tire Having Multiple Built-In Sealant Layers and Preparation Thereof," and is incorporated herein by reference.

BACKGROUND OF THE INVENTION

The present invention is directed to tires having inner sealant layers, and in particular to tires having an ionic butyl-containing sealant layers formed from sealant precursor layers.

Tires consist of multiple annular layers of different compounds, plies, belts, etc., and they are applied before cure in tire building drum for accurate alignment and for higher interlayer bond strengths. Joining and aligning layers before cure result in tire with better uniformity and durability.

Tire puncture is an inherent issue for rubber pneumatic tires. Because of that, sealants have been developed and placed as a layer inner to the tire tread and plies to minimize the impact of the puncture. The absence of suitable technology forces tire companies to apply annular sealant layers after the tires are cured. Examination of recent passenger car (PCR) sealant tires from major tire manufacturers showed no curing bladder markings at the innermost layer thus indicating that annular sealant layers are applied after the tires are cured.

Moreover, the majority of commercially available PCR sealant tires have exposed sealant to tire cavity, which must have been applied after the tire was cured, otherwise, it would foul the curing bladder during tire cure. In addition, in tire where sealant is applied to cured tire, there is only physical bonding and absence of chemical bonding or interfacial cross-linking at the sealant and innerliner interface, which results in relatively poorer adhesion. Poor adhesion may lead to separation of sealant from innerliner, thus losing nail hole sealing capability. Due to poor interfacial bonding, sealant may slide thus creating tire balancing issues.

Application of sealant to a cured tire is cumbersome since the innerliner needs to be very clean prior to sealant application for better physical bonding of sealant-to-innerliner. The way most tires are manufactured, the innermost layer is mostly contaminated with silicones from inside tire paint and/or from curing bladder lubricant for easy removal of tire from bladder mold. Moreover, application of perfectly aligned sealant inside cured tire is cumbersome and time consuming. Tire building machines have laser guidance which help operators to perfectly align layers in tire building drum which is possible if sealant precursor is applied before tire is cured so that sealant precursor forms sealant during cure.

Sealants in cured tires need to have low viscosity (or low storage modulus, G') so that the sealants can easily flow and plug nail holes. Such low viscosity material cannot be directly applied in tire building drum as they will shift, fall off, or deform if applied in tire building drum. Further, punctures can occur at any temperature. A single layer of sealant of low viscosity may work very well at low temperature, but at high temperatures, it might achieve a very low viscosity, which would allow it to flow and pass out of tire during use and pollute and/or damage roadways. By depleting the tire sealant, the tire loses its puncture sealing capacity. Likewise, a single layer of sealant of high viscosity may be very good for high temperature but might be almost solid at cold temperature and thus unable to flow to plug puncture in tires at cold temperature. Thus, one layer of high viscosity sealant may be good for summer tire but it may not be good for winter tire. Likewise, one layer of low viscosity sealant may be good for winter tire but it may not be good for summer tire as it may displace during use or pass out from puncture as viscosity becomes very low at high temperature. For all season tire, two-layer sealant is preferred, one for low temperature puncture sealing and one for high temperature puncture sealing. Moreover, high viscosity sealant layer will tightly hold the low viscosity sealant layer due to interfacial bonding and prevent its movement even when its viscosity become very low in summer months. So, the bonding between the multiple sealant layers must be good to prevent sealant movement particularly the one with low viscosity.

Tires with built-in sealant layer are known in the art. Typically, these tire sealants are formed during tire cure by thermal degradation of peroxide-containing butyl-rubber-based sealant precursor layers, such as for example, U.S. Pat. Nos. 4,895,610; 6,962,181; 7,073,550; 7,674,344; and 8,293,049; and US Patent Publication Nos. 2005/0113502 and 2005/021568, the teachings of which are all hereby incorporated by reference. Sealant layers may be of black or non-black colors and may incorporate short fibers, such as polyester or polyurethane fibers, and other filler aggregate into sealant layers to help to plug nail hole punctures.

It is possible to produce a sealant using ionic butyl. However, simply substituting regular butyl with ionic butyl will not work in production environment. It may be possible to make such an arrangement work with an inefficient, time-consuming, carefully-crafted, hand-made tire, but for working in a production environment, building tack to self needs to be very good e.g. 5 lbs/inch or higher. Intrinsic sealant tires are built by wrapping the sealant precursor layer in tire building drum, overlapping and stitching slightly the two ends. If tack to self is low, the overlapped area will separate causing tire building issues. Such desirable tack to self can be achieved by reducing filler content, changing plasticizer, and using rosin type tackifier alone or in combination with phenolic type.

One of the ways to apply sealant precursor layer is to apply calendered material rolled with a film. The sealant precursor should be removable from film with slight tension without distorting the sealant precursor. Calendered roll may sit in the inventory for several months before being used, so during that time, the tack needs to remain good. One of the ways for accelerated testing is to measure tack after exposing the test surface to air after removing the wrapped film for a short period of time, e.g., 24 hours, instead of waiting for several months or years to test the roll. If exposed tack is good, one can extrapolate that the tack in calendered roll will stay good for prolonged length of time.

BRIEF SUMMARY OF THE INVENTION

The invention is directed to a tire with in-situ generated two or more intrinsic puncture sealant layers based on ionic butyl with two or more different viscosities comprising a supporting tire carcass having one or more layers of ply, an outer circumferential tread, and a radially inner layer, a pair of beads, sidewalls extending radially inward from the axial outer edges of a tread portion to join the respective beads, a sealant comprising an outer layer of sealant and an inner layer of sealant, disposed radially inwardly from said radially inner layer of said tire carcass, wherein the outer layer of sealant and the inner layer of sealant have different viscosities, wherein said sealant provides self-sealing properties to the tire, and wherein said inner layer of sealant is in direct contact with and interfacially cross-linked to said outer layer of sealant with no barrier separating said inner and outer layers of sealant.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE INVENTION

Figure 1:
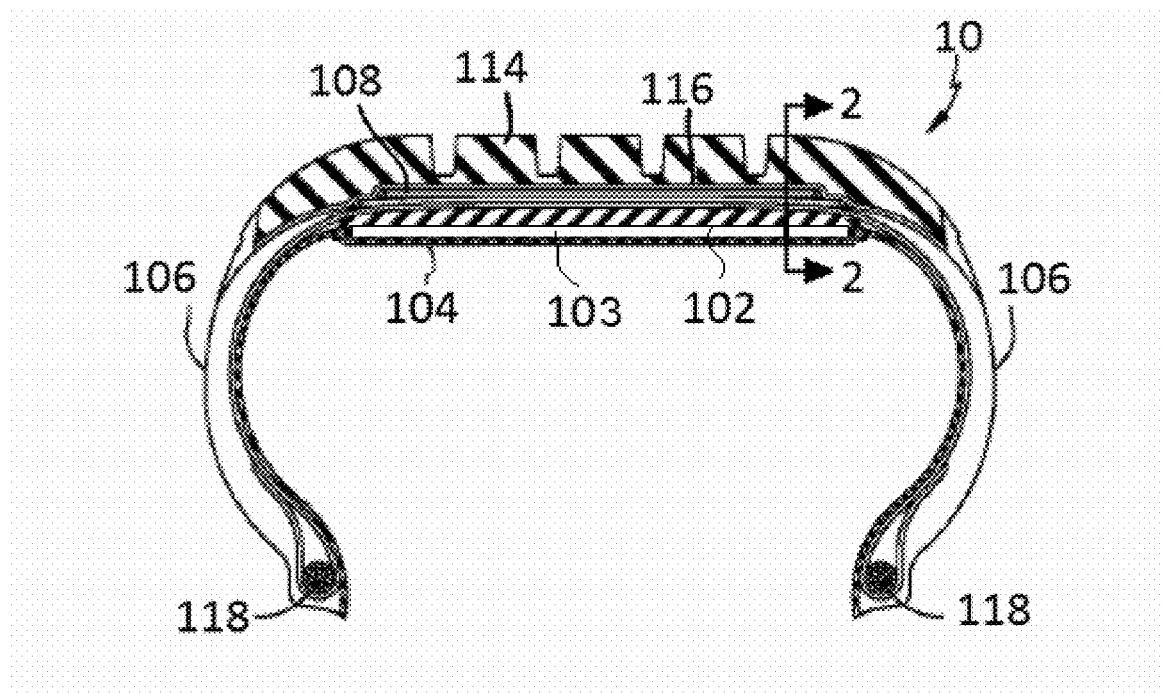
FIG. 1 is a cross-sectional view of a cured tire using the present invention.

The present invention is directed to a tire having two intrinsic (or integral, or built-in) sealant layers formed from two precursor layers during tire cure by chain scission of butyl ionomer compositions catalyzed by peroxide. Thus, the tire has two or more very low molecular weight butyl ionomer sealant layers disposed inside the tire formed from two or more very high molecular weight butyl ionomer sealant precursor layers. (As used herein, the term intrinsic is synonymous with integral or built-in).

When chain scission of high molecular weight ionic butyl polymer occurs, relatively lower molecular weight ionic butyl polymer is formed. Such extremely low molecular weight ionic butyl polymer can also be called liquid ionic butyl polymer or ionic butyl oligomer. As used herein, "oligomer" refers to a material having molecular weight significantly lower than the original polymer/rubber. Oligomers are tacky to touch and often are high viscous liquid. Degree of chain scission can be controlled by adjusting the amount of peroxide, type of peroxide, and combination of peroxides, and also by adjusting the levels and types of plasticizer or filler.

Most rubbers, like natural rubber (NR), nitrile rubber (NBR), styrene-butadiene rubber (SBR), bromobutyl rubber (BIIR), chlorobutyl rubber (CIIR), butadiene rubber (BR), etc., crosslink when heated with suitable peroxide and storage modulus (G') increases after cure. One known exception is butyl rubber (IIR) where chain scission occurs resulting in decrease in viscosity or G' after heating to tire cure temperature.

Ionic butyl is prepared by introducing ionic group in BIIR:

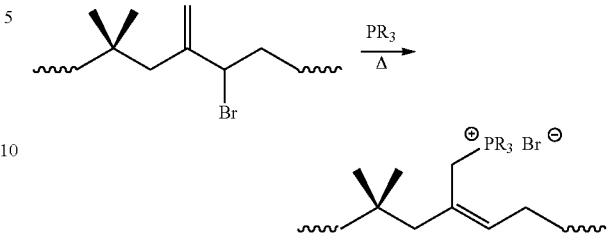

Unlike BIIR, ionic butyl undergoes chain scission when heated with suitable peroxide. This new property generated by converting BIIR into ionic butyl can be used to make a sealant precursor which can be applied in the tire building drum that undergoes chain scission during tire cure forming sealant layer. This allows for a suitable much less cumbersome, manufacturing-friendly PCR tire where sealant precursor layer is applied in tire building drum which is converted into a sealant layer during tire cure. Small amount of double bond present in ionic butyl undergoes crosslinking reaction thus enhancing inter-layer bond strengths e.g. sealant cover layer to sealant layer, between the multiple sealant layers, and sealant layer to innerliner.

Viscosity is dependent on temperature and it reduces with increasing temperature. High viscosity sealant may be good for summer months but if the viscosity is too low, it will pass out from tire puncture like passing of air/liquid. Low viscosity sealant is good for winter months but if viscosity is too high, it may be like other tire layers will not flow and plug nail hole causing flat tire. Thus, it can be beneficial to use multilayer sealant of different viscosities.

Multiple viscosity sealant can be generated by using different type of peroxide, quantity of peroxide, and their combination, or by changing type and amount of filler or plasticizer. The sealant precursor composition must be tacky to self for user-friendliness for the tire-builder.

Sealant compositions based on regular butyl has been described in previous patents. When regular butyl was replaced with ionic butyl, the building tack to self of the ionic butyl sealant composition was negligible relative to regular butyl. Tires are built by putting layer in tire building drum and the ends are slightly overlapped and stitched with a roller. If tack to self is low, separation at the overlapped area occurs, causing tire building issues. To improve building tack, a large number of experiments were conducted using many tackifiers and combination of tackifiers to find suitable tackifier or combination of tackifiers for ionic butyl.

For tire-builder user-friendliness (i.e. ease of use), high building tack is desired otherwise ends of sealant precursor overlapped slightly and stitched with a roller can separate causing building issues. Tackifiers commonly used with regular butyl do not work with ionic butyl. While regular butyl tack is very high, corresponding ionic butyl tack is very low (Table 4). During early experiments, it was found that phenolic-type tackifier (SP1068) in combination with Novares C10 plasticizer imparts higher unexposed tack than when naphthenic oil is used as plasticizer (4.23 lbs/inch vs 0.76 lbs/inch, Table 5). Thus for ionic butyl rubber, Novares C10 is a better plasticizer than most commonly and naturally used oil as plasticizer for compounding tire layer. Thus use of Novares C10 for plasticizing ionic butyl is considered as new finding.

Sealant materials rolled with a film during calendering must retain tack during the aging of the roll so that the tack to self remains good when ready to use. One way to determine tack loss with storage is by accelerated test using sealant layer exposed to air for 24 hours. As noted above, if the sealant tack to self remains good after 24 hours, it means that the sealant tack will remain good when rolled with film and not exposed to air for several months or even years.

The tire comprises a supporting tire carcass comprised of one or more layers of ply, an outer circumferential tread, and a radially innermost innerliner layer, a pair of beads, sidewalls extending radially inward from the axial outer edges of the tread portion to join the respective beads, two or more sealant layers, and a cover layer, disposed on said tire carcass innermost layer, wherein the sealants are formed during tire cure due to high temperature and pressure by chain scission of butyl ionomer based compounds in the presence of peroxide to form an inner layer of low molecular weight butyl ionomer sealant, disposed inwardly from said tire carcass inner layer, to provide self-sealing properties to the tire.

As used herein, the term "sealant precursor" means the compound by itself is not a sealant, but it is transformed into sealant by chain scission during the curing step of tire construction. The "precursor layer" is the layer of sealant precursor. The precursor layer can be 100% ionic butyl rubber or can be ionic butyl rubber blended with other rubbers that can be transformed into a sealant, such as a mixture or both butyl ionomer and butyl rubber, which also undergo chain scission during tire curing at high temperature to form low molecular weight, easy to flow, tacky sealants.

In the present invention, two or more sealant precursor layers are assembled into an unvulcanized rubber tire (generally called a "green tire") using conventional tire building techniques. After an unvulcanized tire is built, including such a sealant precursor layer, the tire is vulcanized employing standard methods. Such a sealant precursor layer is assembled into the tire inwardly from the tire's supporting carcass and outwardly from an innerliner layer (which can be an air barrier layer) in the unvulcanized tire. Alternatively, the sealant precursor layer can also be placed inner to tire innerliner, and, in this case a sealant cover layer is needed, inner to sealant precursor layer with width greater than the sealant precursor layer. The purpose of the sealant cover layer is to prevent thinning of the sealant layer by pressure of the tire curing bladder and to prevent contamination of the tire curing bladder by the tacky sealant. Even after the tire is cured, sealant cover layer protects the tacky sealant from capturing contaminants or even small animals or birds if not appropriately stored.

The physical nature of the sealant precursor layer is that its viscosity is high enough to permit easy handling during the standard steps in the construction of an unvulcanized tire, that is, the sealant precursor layer has enough uncured strength (modulus) to retain its shape during building, and enough tack to self so that the two overlapped ends after stitching with a roller in a tire building drum do not easily separate and also preferably enough tack to stick to adjacent layers during green tire building. After high temperature and pressure vulcanization, sealant layer with low G' is sandwiched between cured layers of significantly higher G'. A typical change of G' at 80° C. of sealant precursor layer (chain scission) and sealant cover layer (crosslinking reaction) by applicants own experimentations is shown below:

|  | Sealant Precursor * | Sealant Cover Layer |
|---|---|---|
| G' at 80° C./5%/1 Hz (MPa) | 0.16 | 0.12 |
| Tire cure at high temperature and pressure | Chain scission to form sealant | Crosslinking reaction |
| G' at 80° C./5%/1 Hz (MPa) | 0.002-0.1 | 2.5 |

* Varied amount and type of peroxide

As the green tire is heated for cure with sealant precursor layers, sealant layers are formed in situ, by chain scission of ionic butyl. In effect, the ionic butyl rubber in the sealant precursor layer formed a low viscosity (or low G'), easy to flow tacky material by chain scission reaction, which has puncture sealing properties. Thus, the sealant precursor layer is transformed into a puncture sealant layer during the high temperature curing of the tire. The chain scission of the sealant precursor layer is effectuated by the presence of one or more peroxides which acts as a catalyst.

Unlike the instant patent application where sealant precursor based on ionic butyl without any solvent is applied in tire building drum for subsequent chain scission, in prior art, Kaszas et al. (2016/0068031) tried to apply crosslinked butyl swelled in a high boiling liquid inside cured tire. Kaszas et al. never demonstrated sealant formation using peroxide but it appears the authors assumed a crosslinking reaction would take place with peroxide, but apparently never actually tested it. Had Kaszas et al. tried peroxide, they would have found that chain scission would have occurred resulting in the formation of a very low viscosity fluid with less viscosity than original solvent polymer mixture. This low viscosity fluid could not have been used as tire sealant and would have rapidly passed out of tire puncture.

Most rubber, including halobutyl rubber, crosslinks with peroxide. Since ionic butyl is derived from halobutyl, Kaszas et al. apparently thought that ionic butyl would also crosslink with peroxide. However, through experimentation, the inventors of the instant application discovered that ionic butyl undergoes chain scission and hence can be utilized for intrinsic/built-in sealant tire. If Kaszas et al. had put peroxide as crosslinking agent in their experimentation, ionic butyl would have undergone chain scission instead of crosslinking as they thought would have occurred resulting is very low viscosity sealant that would have instantly passed out of tire causing flat and polluting the roadway.

Butyl ionomers are derived from halobutyl rubber. Halobutyl rubbers are derived from butyl rubber. Butyl rubber is produced by copolymerizing isobutylene with small amounts of isoprene. Generally, butyl rubber contains from about 0.5 to 4 mole % isoprene and from about 96 to 99.5 mole % percent isobutylene unit. The butyl rubber that can be employed in the polymer composition of the tires of this invention has a number average molecular weight in the range of 200,000 to 600,000 and preferably in the range of about 300,000 to about 500,000. Butyl rubber is then converted to bromobutyl rubber, which is then transformed to butyl ionomers by converting the bromine functionalities into ionic imidazolium bromide groups which results in the formation of reversible ionic associations that exhibit physical cross-linking ability.

At least one butyl ionomer is available from Arlanxeo with trade name X_Butyl™ I4565P that has ML(1+8) value of 56±4 MU at 125° C. and ion content of 0.4±1 mole %, total reactive bromine content of 0.5±0.2 mole % and 1,4-isoprene content of 0.5±0.2 mole %.

Compositions based on 100 phr butyl ionomer rubber can be used in making sealant precursor. Butyl ionomer can be used in combination with other elastomers that degrade at tire cure temperature. One example of such polymer is butyl rubber. Thus, 100 to 5 phr ionic butyl in combination with 0 to 95 phr butyl rubber can be used to create tire puncture sealant composition.

It is preferable for the polymer composition layer assembled into the tires of this invention to have the following composition in parts per hundred rubber (phr):

100 phr butyl ionomer rubber e.g. X_butyl™ I4565P from Arlanxeo about 10 to 80 phr of silicon dioxide e.g. Silene 732D or other filler about 1 to 30 phr of tackifier or combination of tackifiers e.g. gum rosin, SP-25 about 20 to 200 phr calcium carbonate e.g. Hubercarb Q3 from Huber about 5 to 35 phr Novares C10 plasticizer, and from about 4 to 16 phr suitable peroxide.

Any peroxide or combination of peroxides that catalyze the chain scission of ionic butyl based precursor compound at tire cure temperature (130°–210° C.) can be employed. Preferably peroxide compounds are employed which only disintegrate at high temperatures, that is, above about 100° C. (212° F.). Examples of such peroxides are tert-butyl perbenzoate and dialkyl peroxides with the same or different radicals, such as dialkylbenzene peroxides, and alkyl peresters. Preferably the peroxide vulcanizing agent employed will contain two peroxide groups. Frequently the peroxide groups are attached to a tertiary butyl group. The basic moiety on which the two peroxide groups are suspended can be aliphatic, cycloaliphatic, or aromatic radicals. Some representative examples of such peroxide vulcanizing agents include: 2,5-bis(t-butyl peroxy)-2,5-dimethyl hexane; 1,1-di-t-butyl peroxy-3,3,5-trimethyl cyclohexane; 2,5-dimethyl-2,5-di(t-butyl peroxy) hexyne-3; p-chlorobenzyl peroxide; 2,4-dichlorobenzyl peroxide; 2,2-bis-(t-butyl peroxy)-butane; di-t-butyl peroxide; benzyl peroxide; 2,5-bis(t-butyl peroxy)-2,5-dimethyl hexane, dicumyl peroxide; and 2,5-dimethyl-2,5-di(t-butyl peroxy) hexane. Such peroxide catalyst for chain scission can be added to the polymer composition layer in pure form (100 percent active peroxide) or on an inert, free-flowing mineral carrier. Calcium carbonate and silica are some examples of inert carrier. Such carrier composition containing from about 35 to 60 weight percent active ingredient (peroxide) can be employed very successfully. For example, 40 percent by weight dicumylperoxide on an inert carrier can be employed as the peroxide in the polymer composition layer with good results.

While the mechanism may not be fully understood, it is within the scope of the present invention to employ an activating agent, such as 2,2,6,6-tetra alkyl piperidine based hindered amine, which will activate the organoperoxide, and in a sense, enable a reduction in the amount of the organoperoxide to more efficiently degrade the butyl ionomer rubber during the formation of the sealant layer. Such activating agents are known in the art, such as U.S. Pat. No. 7,674,344 to D'Sidocky et al., the disclosure of which is incorporated by reference.

One representative example of such 2,2,6,6-tetra alkyl piperidine based hindered amine is, for example, a 50/50 mixture of poly[[6-[1,1,3,3,-tetramethylbutyl)amino]-s-triazine-2,4-diyl][2,2,6,6,-tetramethyl-4-piperidyl)imino] hexamethylene[(2,2,6,6-tetramethyl-4-piperidinyl)imino]] compound (referred to herein as "PTP") and bis(hydrogenated tallow alkyl), amines oxidized and sold as Irgastab® FS410 FF from BASF.

Another example of peroxide activating agent is a mixture of PTP, bis(hydrogenated tallow alkyl) amies oxidized, and bis(2,2,6,6-tetramethyl-4-piperidinyl) sebacate sold as Irgastab® FS811 from BASF.

Another example of peroxide activating agent is poly[[6-[1,1,3,3,-tetramethylbutyl)amino]-1,3,5-triazine-2,4-diyl][2,2,6,6,-tetramethyl-4-piperidyl)imino]-1,6-hexanediyl[(2,2,6,6-tetramethyl-4-piperidinyl)imino]] available as Chimassorb® 944 FDL from BASF.

In practice, exemplary of composites that contain, and therefore are comprised of, said PTP, which may also comprise said bis(2,2,6,6-tetramethyl-4-piperidinyl)sebacate and which may also optionally contain an oxidized bis(halogenated tallow alkyl amine). In practice, the aspect of utilizing said 2,2,6,6-tetra alkyl piperidine based hindered amines, and particularly said PTP or composites of 2,2,6,6-tetra alkyl piperidine based hindered amines which contain (include) said PTP to activate the organoperoxide in the chain scission of the butyl ionomer rubber of the sealant precursor is considered herein to be important in order to reduce as much as possible the concentration of the organoperoxide in the sealant precursor based on butyl ionomer rubber-based composition.

The various components of the sealant layer can be mixed together using any convenient rubber mixing equipment, such as a Banbury mixer. This rubber composition used in the sealant layer has sufficient viscosity (or G') and unvulcanized tack to enable its incorporation into an unvulcanized tire without departing from standard, long standing tire building techniques and without the use of complicated, expensive tire building equipment.

The strip of butyl ionomer based sealant precursor composition should extend from one shoulder of the tire to the other, in other words, it should cover the crown area of the tire. The thickness of the sealant precursor layer can vary depending on tire size. Generally, the thickness of the polymer composition layer will range from about 0.1 cm (0.04 inches) to about 0.635 cm (0.25 inches). It is generally preferred for the polymer composition layer to have a thickness of 0.2 cm (0.08 inches) to 0.4 cm (0.16 inches). In passenger tires it is normally most preferred for the polymer composition layer to have a thickness of about 0.25 cm (0.1 inches).

After the unvulcanized pneumatic rubber tires of this invention are assembled, they are vulcanized using a normal tire cure cycle. The tires of this invention can be cured over a wide temperature range. However, it is generally preferred for the tires of this invention to be cured at a temperature ranging from about 132° C. (270° F.) to about 166° C. (330° F.). It is more preferred for the tires of this invention to be cured at a temperature ranging from a 143° C. (290° F.) to 177° C. (350° F.).

Sealant Cover Layer

In commercially available passenger (PCR) sealant tires, no bladder mark on sealant cover layer or the sealant has no sealant cover layer indicating that sealant is applied after the tire is cured. In commercially available Duraseal™ truck bus radial (TBR) tire, innerliner has bladder mark thus indicating that the sealant is applied after the tire is cured and placed underneath the innerliner or outer to innerliner. Since TBR innerliner is very thick for tire air retention, such innermost layer cannot stretch and plug nail holes. When there is a sealant underneath innerliner, there is a layer between sealant and ply to prevent sealant to enter between the cords of the ply. It is preferred that the sealant be placed inner to innerliner and covered with a readily stretchable thin sealant cover layer so that in some cases it can stretch and plug nail holes.

Compositions of three different sealant cover layers are shown in Table 1 and one of the sealant cover layers is same as tire innerliner. Three-layer laminates were stitched together with a roller followed by bladder molding details of which are shown in Table 2. When the sealant cover layers were based on 100BIIR or 50BIIR/50NR, bulging of the laminate occurred when they come out hot fresh out of mold. When the sealant cover layer was based on 50BR/50NR bulging of the laminate did not occur when they come out hot fresh out of mold (insert in Table 2).

TABLE 1

Three different sealant cover layers investigated
(All ingredients in parts per hundred rubber (phr))

|  | Innerliner | 0C007D | 0C028C |
|---|---|---|---|
| *1st Step* | | | |
| High cis BR (Buna CB 1220) |  |  | 50 |
| BIIR | 100 | 50 |  |
| NR (SMRL) |  | 50 | 50 |
| Agilon 400G |  | 50 | 30 |
| N 660 Carbon Black | 60 |  |  |
| Austin Black 325 | 15 |  |  |
| TiO$_2$ (Rutile) |  | 2 |  |
| Akrosprerse 4283 Red |  | 2 |  |
| Naphthenic oil (Stanplas 150) | 10 | 10 | 6 |
| Struktol 40MS | 5 |  |  |
| Stearic acid | 2 | 2 |  |
| MgO | 1 | 1 |  |
| SP1048 | 6 | 4.5 |  |
| Clay |  | 20 |  |
| Wingtack 86 |  | 8 |  |
| TMQ |  |  | 1.5 |
| Perkalink 900 |  | 2 | 2 |
| 6 PPD |  |  | 1.5 |
| Microcrystalline wax (Akrowax Micro 23) |  |  | 2 |
| *2nd Step* | | | |
| CBS/CBTS (A) |  |  | 1 |
| ZnO | 3 | 3.72 | 1.25 |
| RM Sulfur (S) | 0.5 | 0.22 | 0.75 |
| 75% DPG |  |  | 1.33 |
| MBTS | 1.5 | 1.7 |  |
| TOTAL |  |  | 146 |
| Estimated Sp. Gravity |  |  | 0.94 |
| *Physical Properties* | | | |
| Cure time at 150° C. |  |  | 30 |
| Duro | 56 | 38 | 32 |
| M300 | 599 | 245 | 242 |
| Tensile Strength (psi) | 1244 | 1444 | 1783 |
| Elongation (%) | 709 | 834 | 791 |
| Die C Tear (lb/inch) | 210 | 120 | 234 |

TABLE 2

Bladder molding of laminates of innerliner - sealant precursor - sealant cover
(350° F./220 psi/12 min)

| Innerliner Layer (0C015A) | 6" × 6" × 0.15" | | |
|---|---|---|---|
| Sealant Precursor Layer (0C020C) | 4" × 4" × 0.1" | | |
| Sealant cover Layer (6" × 6" × 0.15") | 100BIIR | 50BIIR/50NR | 50BR/50NR |

TABLE 2-continued

Bladder molding of laminates of innerliner - sealant precursor - sealant cover
(350° F./220 psi/12 min)

Laminate immediately after coming out from bladder mold

| Appearance | Bulging | Bulging | No bulging |
|---|---|---|---|
| Picture | | | |

In prior art, it was mentioned that bulging can be prevented by drilling hole in innerliner followed by attachment of a non-woven layer so that gases escape without contaminating the curing bladder (See, Majumdar et al. U.S. Pat. No. 8,316,903) and was reduced to practice. However, prevention of bulging by using a thin layer of rubber composition based on 50BR/50NR never has been experimentally tried and hence never been reduced to practice.

Interpretation of Bulging of Sealant Cover Layer

During heat treatment of sealant precursor layer, chain scission of ionic butyl leads to the formation of lower molecular weight ionic butyl. During the reaction of peroxides with ionic butyl, some volatiles and gaseous byproducts are also produced resulting in bulging at high temperature of the first two laminates. However, the third laminate did not bulge. It is hypothesized that volatiles produced permeated through 50BR/50NR sealant cover layer but could not permeate immediately through the other two sealant cover layers based on 100BIIR or 50BIIR/50NR. Hypothesis is supported by permeation data of rubbers obtained from ExxonMobil web site and are shown in Table 3 (Exxon Mobile Chemicals, https://3.imimg.com/data3/EE/JO/MY-8754992/butyl-rubber-sheets.pdf)

TABLE 3

Permeability of various elastomers used in tires to gases at 25° C. relative to natural rubber gum vulcanizates = 100

| Elastomer | O$_2$ | N$_2$ | CO$_2$ | Air |
|---|---|---|---|---|
| Natural rubber (NR) | 100 | 100 | 100 | 100 |
| Polybutadiene or Butadiene Rubber (BR) | 82 | 80 | 105 | 81 |
| Styrene-butadiene Rubber (SBR) | 73 | 78 | 94 | 76 |
| Butyl Rubber (HR) | 5.6 | 5 | 4 | 4.8 |

Figure 3:
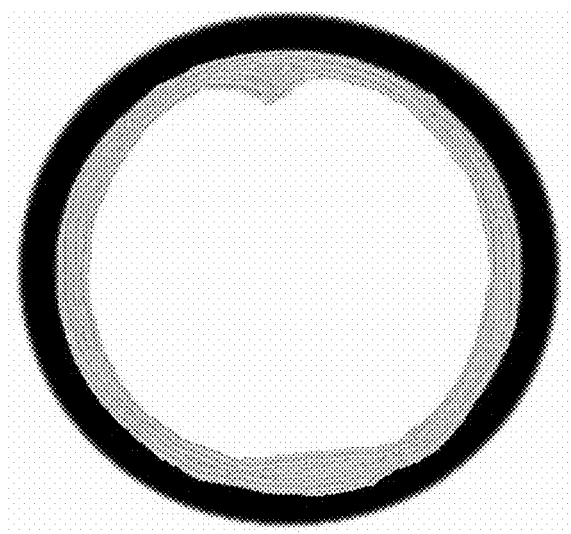
FIG. 3 is a side cross-section of a prior art tire showing sealant pooling and sagging.

This is a significant advancement in built-in-sealant or intrinsic sealant technology. Now it is possible to build tire with a very thin layer of sealant cover layer without worrying about its tear or catastrophic burst as tires comes out of mold or trapped volatiles between sealant and sealant cover layer. No longer a thick innerliner is needed to contain the sealant as in commercially available Durseal™ tire produced by built-in sealant technology based on regular butyl. Volatiles and liquids formed as byproducts coexist with sealants in Duraseal™ tire may result in movement of sealant thus impairing tire balance which require expensive compartmentalization (U.S. Pat. No. 10,737,539), see FIG. 4. Thin layer of sealant cover, means less rubber use thus reducing the overall tire weight which translates to higher fuel economy from such built-in sealant tire and less heat built-up translate to longer tire durability. Moreover, when a vehicle is at rest, sealant will not sag or concentrate at bottom due to gravity which may occur in tires without sealant cover layer particularly during summer months when the viscosity is low (see FIG. 3).

Figure 4:
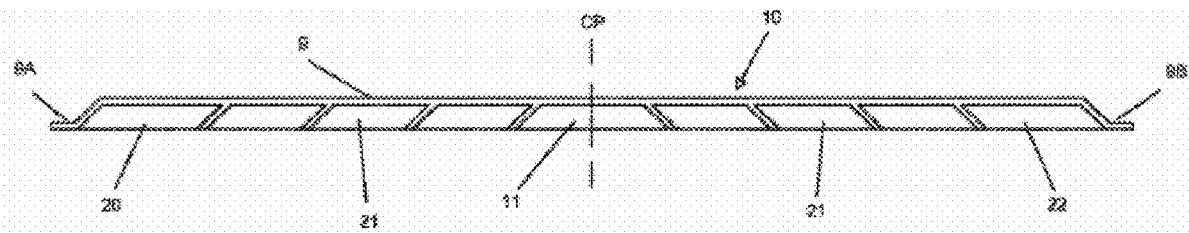
FIG. 4 is a cross-section of prior art tire with compartments (U.S. Pat. No. 10,737,539).

FIG. 4. shows a prior art tire (U.S. Pat. No. 10,737,539) with sealants in 9 compartments. During tire rotation, due to centrifugal force, sealant tend to flow into the central crown area, near the center point (CP) leaving the areas near the shoulder unprotected. The same sealant is used throughout, but in many compartments 11, 20, 21, 22 to prevent depletion at two edges. In the present invention, no significant air pocket or liquid chain scission product is present to move sealant layer. Therefore, the compartments as shown in FIG. 4 are not needed in the present invention. In the instant patent application, sealant is tightly contained and covered with sealant cover layer with no space to move to a different location.

Determination of Unexposed Tack

Sealant precursor of thickness 0.08 inches is formed between two films. Film from one side was removed from two pieces. Precursor sides of two pieces of materials are stitched with a roller keeping some area for the test equipment jaw. Then 180° angle peel strength was determined at room temperature as is well known to those familiar with the art.

Determination of Exposed Tack

Similar process as unexposed tack determination except that two pieces are exposed to air in a conditioned room for approximately 24 hours and then two pieces are stitched with a roller followed by determination of 180° angle peel strength.

Sealant Precursor Based on Regular Butyl Vs Ionic Butyl

Sealant precursor based on regular butyl and corresponding ionic butyl are mixed, details of which are shown in Table 4. Unexposed and exposed tack to self were determined and recorded in Table 4. It shows that while tack to self of regular butyl sealant precursor is good to build tires while tack to self of ionic butyl sealant is negligible and building tires will be cumbersome.

After sealant formation, tan δ at 80° C. of regular butyl is 1.56 while tan δ of ionic butyl at 80° C. is 94% lower with a value of 0.09. It is well known to those familiar with tire material compounding, lower tan δ is preferred for lower heat built-up during flexing. This shows that in built-in sealant based on ionic butyl, heat rise from flexes during tire use is expected to be significantly lower in sealant based on ionic butyl than sealant based on regular butyl like in Duraseal™ tires. This translates to higher durability of built-in sealant tire based on ionic butyl than the ones based on regular butyl.

TABLE 4

Sealant precursors based on regular butyl and ionic butyl
(All ingredients in parts per hundred rubber (phr))

|  | Regular Butyl | Ionic Butyl |
| --- | --- | --- |
| Regular butyl | 100 |  |
| Ionic Butyl |  | 100 |
| Naphthenic Oil | 18 | 18 |
| Silene 732D | 20 | 20 |
| SP1068 | 10 | 10 |
| Struktol 40MS | 5 | 5 |
| Akrosperse 409 Green | 0.5 | 0.5 |
| Calcium Carbonate | 100 | 100 |
| AkroChem VC 40K | 5 | 5 |
| PRECURSOR PROPERTIES | | |
| Unexposed Tack (lbs/inch) | 11.26 | 0.76 |
| Exposed Tack (lbs/inch) | 7.02 | 0 |
| PROPERTIES OF SEALANT | | |
| Tan δ at 80° C. | 1.56 | 0.09 |
| G' (MPa) | 0.036 | 0.043 |

Table 5 shows effect of replacing naphthnic oil with Novares C10 liquid. The unexposed tack improves from 0.76 lb/inch to 4.23 lbs/inch. As higher building tack is needed from ionic butyl-based sealant precursor, substitution of oil with Novares C-10 liquid makes sense, although, composition need to be further improved to get higher exposed tack

TABLE 5

Naphthenic oil vs oil substitute (Novares C10)
in sealant precursor based on ionic butyl
(All ingredients in parts per hundred rubber (phr))

|  | Naphthenic oil | Novares C-10 |
| --- | --- | --- |
| Ionic butyl | 100 | 100 |
| Naphthenic Oil | 18 |  |
| Novares C10 |  | 18 |
| Silene 732D | 20 | 20 |
| SP1068 | 10 | 10 |
| Struktol 40MS | 5 | 5 |
| Akrosperse 409 Green | 0.5 | 0.5 |
| Calcium Carbonate | 100 | 100 |
| AkroChem VC 40K | 5 | 5 |
| PRECURSOR PROPERTIES | | |
| Unexposed Tack (lbs/inch) | 0.76 | 4.23 |
| Exposed Tack (lbs/inch) | 0 | 0 |
| PROPERTIES OF SEALANT | | |
| Tan δ at 80° C. | 0.09 | 0.084 |
| G' (MPa) | 0.043 | 0.06 |

To improve building tack, a large number of tackifiers were tried, details of which are shown in Table 6. Some tackifiers showed better than others and exposed tack were not yet satisfactory as maximum value obtained was 1.87 lbs/inch which is still not sufficient.

TABLE 6

Evaluation of several tackifiers in sealant precursor composition based on ionic butyl
(All ingredients in parts per hundred rubber (phr))

|  | 26A1 | 26A2 | 26A3 | 26A4 | 26A5 | 26B1 | 26A7 | 26A8 |
| --- | --- | --- | --- | --- | --- | --- | --- | --- |
| 1st Mixing Step (Drop 160° C.) | | | | | | | | |
| Butyl Ionomer | 100 | 100 | 100 | 100 | 100 | 100 | 100 | 100 |
| Novares C-10 | 23 | 23 | 23 | 23 | 23 | 23 | 23 | 23 |
| R40 | 10 | | | | | | | |
| R98 | | 10 | | | | | | |

TABLE 6-continued

Evaluation of several tackifiers in sealant precursor composition based on ionic butyl
(All ingredients in parts per hundred rubber (phr))

|  | 26A1 | 26A2 | 26A3 | 26A4 | 26A5 | 26B1 | 26A7 | 26A8 |
|---|---|---|---|---|---|---|---|---|
| M130 |  |  | 10 |  |  |  |  |  |
| HXL100 |  |  |  | 10 |  |  |  |  |
| RP103 |  |  |  |  | 10 |  |  |  |
| SP-25 |  |  |  |  |  | 15 |  |  |
| D95 |  |  |  |  |  |  | 10 |  |
| Gum Rosin |  |  |  |  |  |  |  | 10 |
| Akrosperse 409 Green EPMB | 0.5 | 0.5 | 0.5 | 0.5 | 0.5 | 0.5 | 0.5 | 0.5 |
| Silene 732D | 20 | 20 | 20 | 20 | 20 | 20 | 20 | 20 |
| Calcium Carbonate | 100 | 100 | 100 | 100 | 100 | 100 | 100 | 100 |
| 2nd Mixing Step (Drop 110° C.) |  |  |  |  |  |  |  |  |
| Akrochem VC-40K | 5 | 5 | 5 | 5 | 5 | 5 | 5 | 5 |
| TOTAL |  |  |  |  |  |  |  |  |
| Tack to self (a) in lbs/inch - 1-days after test pieces preparation | | | | | | | | |
| Unexposed | 4.98 | 1.48 | 0.67 | 0.85 | 1.45 | 2.32 | 3.50 | 1.03 |
| 24 h Exposed | 1.35 | 1.87 | 0.44 | 0.99 | 0.52 | 0.36 | 0.69 | 0.52 |

(a) All of them show adhesive failure

Next several combinations of tackifiers were investigated. Combination of SP-25 (phenolic type) with other class of tackifiers are shown in Table 7. Satisfactory unexposed and exposed tack values were obtained when 5 phr SP-25 in combination with 15 phr gum rosin was investigated (compound 0C031B).

Sealant Properties in Commercial Tires

Two commercial PCR tires from two different major manufactures were purchased and inspected. One tire had exposed sealant to tire cavity thus indicating that the sealant was applied after tire cure. The second tire sealant was covered with a thin film the ends of which was overlapped

TABLE 7

Evaluation of several combinations of tackifiers in sealant
precursor compositions based on ionic butyl
(All ingredients in parts per hundred rubber (phr))

|  | 26B2 | 26B3 | 26B4 | 26B5 | 26B6 | 26B7 | 0C031A | 0C031B |
|---|---|---|---|---|---|---|---|---|
| 1st Mixing Step (Drop 160° C.) |  |  |  |  |  |  |  |  |
| Butyl Ionomer | 100 | 100 | 100 | 100 | 100 | 100 | 100 | 100 |
| Novares C-10 | 23 | 23 | 23 | 23 | 23 | 23 | 23 | 23 |
| Akrosperse 409 Green EPMB | 0.5 | 0.5 | 0.5 | 0.5 | 0.5 | 0.5 | 0.5 | 0.5 |
| Silene 732D | 20 | 20 | 20 | 20 | 20 | 20 | 20 | 20 |
| Calcium Carbonate | 100 | 100 | 100 | 100 | 100 | 100 | 100 | 100 |
| SP-25 | 5 | 5 | 5 | 5 | 5 | 5 | 5 | 5 |
| R40 | 5 |  |  |  |  |  |  |  |
| R98 |  | 5 |  |  |  |  |  |  |
| M130 |  |  | 5 |  |  |  |  |  |
| HXL 100 |  |  |  | 5 |  |  |  |  |
| D95 |  |  |  |  | 5 |  |  |  |
| Gum Rosin |  |  |  |  |  | 5 | 10 | 15 |
| 2nd Mixing Step (Drop 110° C.) |  |  |  |  |  |  |  |  |
| Akrochem VC-40K | 5 | 5 | 5 | 5 | 5 | 5 | 5 | 5 |
| Unexposed | 3.71 | 0.31 | 2.55 | 2.59 | 1.82 | 8.79 | 3.83 | 12.03 |
| 24 h Exposed | 0.53 | 0.56 | 1.22 | 0.64 | 0.22 | 0.71 | 4.06 | >17.78 |

(a) All of them show adhesive failure except the exposed sample with value of >17.78 which showed cohesive failure and not joined together. The film had no bladder mark thus indicating that the sealant was also applied after the tire was cured.

TABLE 8

Sealant Properties in Commercial Tires

| Property | Tire # 1 (Continental) | Tire # 2 (Pirelli) |
|---|---|---|
| Mooney viscosity at 100° C. | 3.1 | 14.8 |
| G' at 80° C./1 Hz/10% Strain (kPa) | 3.7 | 29.6 |

Above table confirms that Mooney viscosity is related to G'. Commercial tires are compromised. Tire #1 is expected to be better than tire #2 in colder temperature puncture due to low viscosity. Tire #2 is expected to be better than tire #1 in warmer temperature puncture due to high viscosity and it is a summer tire.

Following table shows that sealant of lower viscosity can be generated by using Vul-Cup® peroxide relative to same phr of Di-Cup® peroxide.

TABLE 9

Peroxide concentration and type in sealant composition and G' of sealant after heat treatment (All ingredients in parts per hundred rubber (phr))

|  | 19CA594, 595 | 19CA598 | 19CA599 |
|---|---|---|---|
| Ionic butyl | 100 | 100 | 100 |
| Other Ingredient |  | Same |  |
| Di-Cup ® 40KE | 9 | 0 | 9 |
| Vul-Cup ® 40 KE | 3 | 9 | 0 |
| G' at 80° C./1 Hz/10% Strain (precursor) (MPa) | 0.18 | 0.19 | 0.18 |
| G' at 80° C./1 Hz/10% Strain (sealant) (MPa) | 0.004 | 0.005 | 0.011 |

Di-Cup ® 40KE is 40 weight % dicumyl peroxide in inert filler
Vul-Cup ® 40KE is 40 weight % a,a'-bis(tert-butylperoxy(diisopropylbenzene in inert filler.

Following table shows that sealant viscosity can be reduced by increasing the concentration of peroxide in tacky sealant precursor composition (like compound 0C031B in Table 7).

TABLE 10

Effect of peroxide on G' of sealant formed in RPA (All ingredients in parts per hundred rubber (phr))

| Ingredients | 21KB001 | 21KB002 | 21KB003 | 21KB004 | 21KB005 |
|---|---|---|---|---|---|
| Ionomer | 100 | 100 | 100 | 100 | 100 |
| Silene 732D | 20 | 20 | 20 | 20 | 20 |
| 409 Green MB | 0.5 | 0.5 | 0.5 | 0.5 | 0.5 |
| Novares C10 | 23 | 23 | 23 | 23 | 23 |
| SP-25 | 5 | 5 | 5 | 5 | 5 |
| Gum Rosin | 15 | 15 | 15 | 15 | 15 |
| CaCO3 | 100 | 100 | 100 | 100 | 100 |
| TOTAL | 263.5 | 263.5 | 263.5 | 263.5 | 263.5 |
| 2$^{nd}$ step mixing |  |  |  |  |  |
| VC 40K (Peroxide) | 0 | 3 | 5 | 7 | 9 |

TABLE 10-continued

Effect of peroxide on G' of sealant formed in RPA (All ingredients in parts per hundred rubber (phr))

| Ingredients | 21KB001 | 21KB002 | 21KB003 | 21KB004 | 21KB005 |
|---|---|---|---|---|---|
| PRECURSOR (RPA before 210° C. heat) at 80° C./1 Hz |  |  |  |  |  |
| G' (MPa) | 0.211 | 0.182 | 0.182 | 0.177 | 0.166 |
| SEALANT (RPA after 11 minutes at 210° C./10% strain/1 Hz) at 80° C./1 Hz |  |  |  |  |  |
| G' (MPa) | 0.184 | 0.129 | 0.107 | 0.089 | 0.062 |

For ease of illustration, some internal materials of the tire have been omitted from the drawings, such as belts and plies, but they remain in the finished tire.

Figure 2:
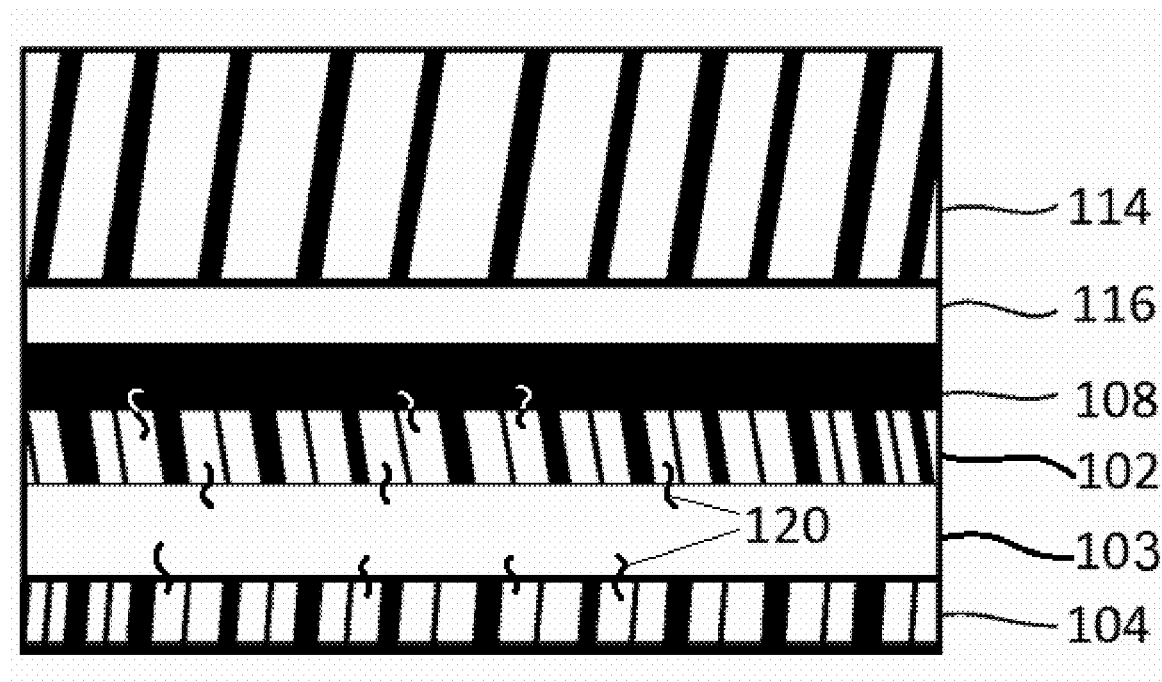
FIG. 2 is a cross-sectional enlarged view of the tire in FIG. 1 taken along line 2-2.

FIG. 1 and the expanded view through 2-2 shown in FIG. 2 illustrates the use of the present invention. It is a simplified illustration of the sealant and sealant cover layers in a cured tire 10, where the layers are not shown to scale since it is the ordering of the layers, not the specific widths and thicknesses that is important. The width can range from full tire width, down to a small strip along the center of the tire. Sealant layers 102 and 103 formed from two precursor layers and a sealant cover layer or innerliner 104 are shown in a general form. Width of the sealant cover layer 104 is to be wider than the width of the sealant layers 102, 103 to cover the entire sealant. Once the tire is vulcanized, the sealants 102 and 103 form from precursor layer. FIG. 1 also illustrates the present invention in which the sealant layers are between innerliner 104 and a layer of squeegee 108. Squeegee layer 108 is between the innermost layer of supporting carcass 116 and the sealant layers 102, 103, formed from precursor layers during tire cure. The use of a squeegee layer is known in the art and is optional and employed as needed in the process of creating the sealant layer. FIG. 1 also shows tread 114, carcass ply 116, and the inextensible beads 118, and tire sidewalls 106 which are part of the tire.

FIG. 2. shows a cross-section of cured tire showing interfacial cross-linking 120 between sealant layers 102 and 103, as well as the interfacial cross-linking 120 between the squeegee layer 108 and sealant layer 102, and between cover layer 104 and sealant layer 103. Such interfacial cross-linking 120 does not occur in tires where sealant is applied inside cured tire resulting in relatively poor inter-layer bonding and thus creating inferior tire.

It is well known that sealant is made of ionic butyl has very good barrier properties. So, it was found that it is possible to reduce the thickness of the innerliner layer underneath the sealant layer. Thus, it was found that the barrier properties from innerliner were not required, so the innerliner is not needed in this location. This will reduce tire weight, reduce material use and reduce heat generation thus prolonging tire life.

The foregoing embodiments of the present invention have been presented for the purposes of illustration and description. These descriptions and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated.

What is claimed is:

1. A tire with in-situ generated two or more intrinsic puncture sealant layers having different viscosities based on ionic butyl sealant precursors comprising:
   a supporting tire carcass having an outer circumferential tread, and a radially inner layer,
   a pair of beads,
   sidewalls extending radially inward from the axial outer edges of a tread portion to join the respective beads,
   two or more in-situ generated sealant layers formed from ionic butyl sealant precursors comprising an outer layer of sealant and an inner layer of sealant, disposed radially inwardly from said tire carcass,
   wherein the outer layer of sealant and the inner layer of sealant have different viscosities,
   wherein said sealant layers provide self-sealing properties to the tire, and
   wherein said inner layer of sealant is in direct contact with and interfacially cross-linked to said outer layer of sealant with no barrier separating said inner and outer layers of sealant.

2. The tire of claim 1, wherein said ionic butyl sealant precursor composition comprises, based on its polymer content, about 100 parts by weight ionic butyl rubber having a number average molecular weight of 200,000 to 500,000, and a Mooney viscosity ranging from about 40 to 58, about 5 to 35 parts by weight of a plasticizer, about 100 parts of calcium carbonate, about 50 parts of silica, and about 1 to 16 parts per hundred rubber (phr) of a peroxide chain scission catalyst.

3. The tire of claim 1 wherein said in-situ generated sealant layers comprise low molecular weight ionic butyl formed by chain scission.

4. The tire of claim 1 wherein said in-situ generated sealant layers comprise low molecular weight oligomeric ionic butyl formed by chain scission.

5. The tire of claim 1 wherein storage modulus (G') of said in-situ generated sealant layers at 80° C./10% strain/1 Hz is in the range 0.11-0.3 MPa.

6. The tire of claim 1 wherein storage modulus (G') of said in-situ generated sealant layers at 80° C./10% strain/1 Hz is in the range 0.001-0.30 MPa.

7. The tire of claim 1 wherein said in-situ generated layers of sealant are substantially free of solvent.

8. The tire of claim 1 wherein said sidewalls extending radially inward from the axial outer edges of the tread portion to join the respective beads form a tire cavity, and wherein none of the sealant layers are exposed to said tire cavity.

9. The tire of claim 1 wherein no innerliner is present under sealant layers.

10. The tire of claim 1, wherein said inner and outer layers of sealant are inner to the tire innerliner and wherein a sealant cover layer forms an innermost layer of the tire.

11. The tire of claim 10 wherein said sealant cover layer comprised predominantly of a rubber selected from natural rubber, butadiene rubber, and styrene-butadiene rubber, and combinations thereof.

12. The tire of claim 1, wherein said inner and outer layers of sealant are disposed between a squeegee layer and a tire innerliner.

13. The tire of claim 12 wherein said in-situ generated sealant layers comprise low molecular weight ionic butyl formed by chain scission.

14. The tire of claim 12 wherein said in-situ generated sealant layers comprise low molecular weight oligomeric ionic butyl formed by chain scission.

15. The tire of claim 12 wherein said outer layer of sealant is interfacially bonded to said squeegee layer and said inner layer of sealant is interfacially bonded to said innerliner.

* * * * *